UNITED STATES PATENT OFFICE.

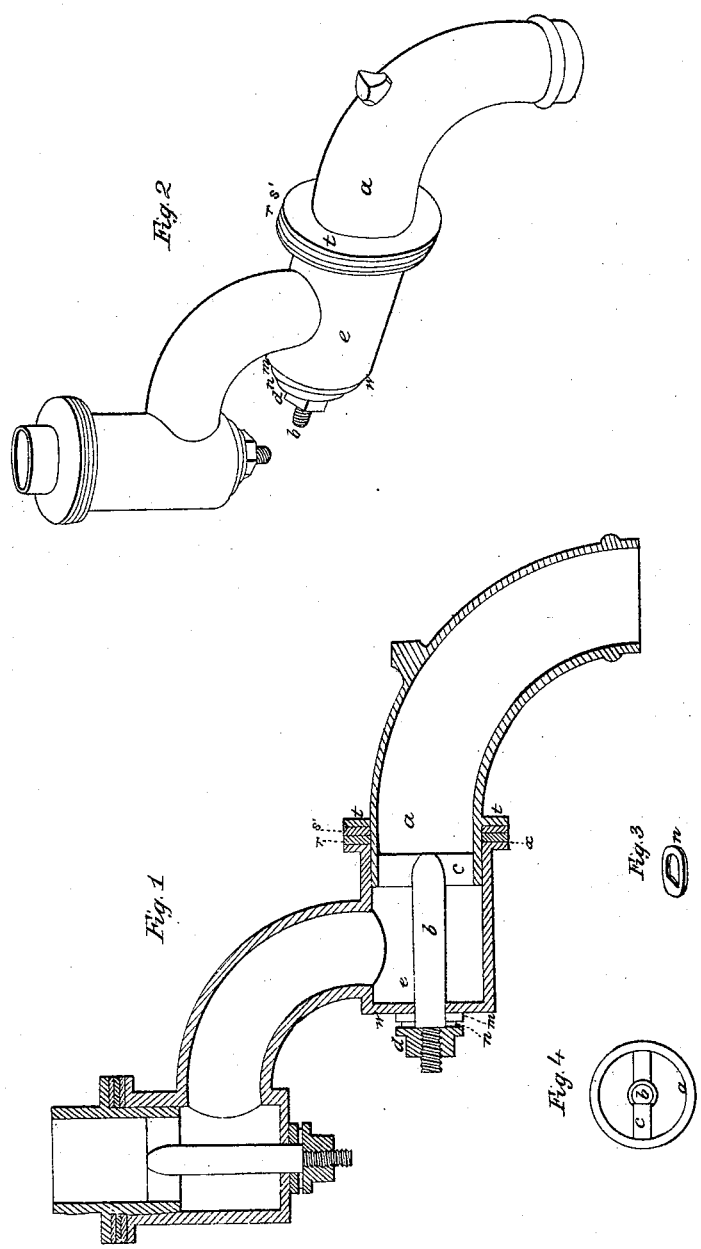

D. KAHNWEILER, OF WILMINGTON, NORTH CAROLINA.

PIPE-COUPLING.

Specification of Letters Patent No. 20,717, dated June 29, 1858.

*To all whom it may concern:*

Be it known that I, DAVID KAHNWEILER, of Wilmington, in the county of New Hanover and State of North Carolina, have invented an Improvement in Joints for Pipes for Water and Gas, and that the following is a full, clear, and exact description of the principle or character which distinguishes it from all other things before known and of the usual manner of making, modifying, and using the same, reference being had to the accompanying drawing, of which—

Figure 1 is a longitudinal section through the middle of the joints and tubes. Fig. 2 an elevation or perspective of the joints and tubes. Fig. 3 a view of the metal washer *n*. Fig. 4, a detached view of the open end of section *a*.

My invention consists in an improvement in swiveling-elbow joints for conveying gas, steam or water described as follows.

Upon one end of a male section *a* of a joint I cast an axial stem or rod *b*, said stem projecting from the cross bar *c* which is cast with and just within the open end of the section. This rod has upon its projecting end a screw-thread to fit the tightening nut *d*. This rod passes through the axis of the female section *e* of the joint and through a suitable aperture in the covered end of section *e* beyond which it projects sufficiently to admit the washers *m* and *n* and tightening nut *d*.

The washer *m* is of vulcanized rubber and the washer *n* is of metal and of the shape indicated in Fig. 3 to fit the axial stem which is squared on one side at this point to prevent the washer from turning around when the joint is turned or swiveled. The face *s* of the flange *t* is left rough as it comes from the mold and the faces *w*, *x* of the female section are trued so that a very little work is required to make a joint of this kind air or water tight and by a series of these joints universal joints can be made in a most economical manner. I usually employ two washers *r*, *s'*, to complete a joint, *r* being of rubber and *s'* usually of leather.

What I claim as my improvement in swiveling elbow joints for pipes for conveying gas, steam or water, is—

Combining with the male section (*a*) of the joint, an axial stem or rod (*b*) which passes into and through the female section (*e*), said stem having upon its projecting end a screw thread to receive a tightening nut (*d*) and the joints (*w*) and (*x*) being provided with suitable washers all as herein set forth.

DAVID KAHNWEILER.

Witnesses:
 CHAS. G. PAGE,
 R. J. FALCONER.